Patented July 27, 1943

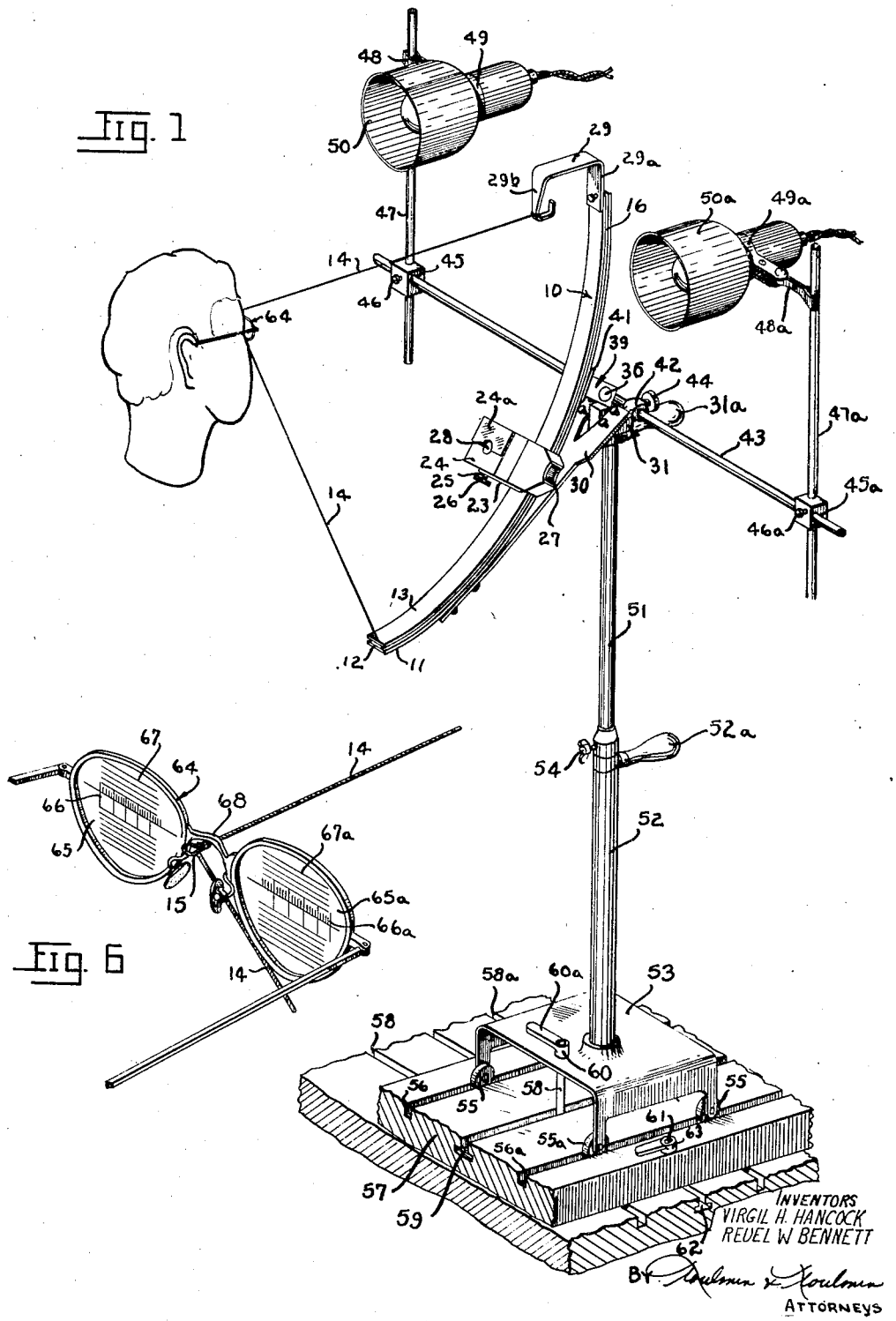

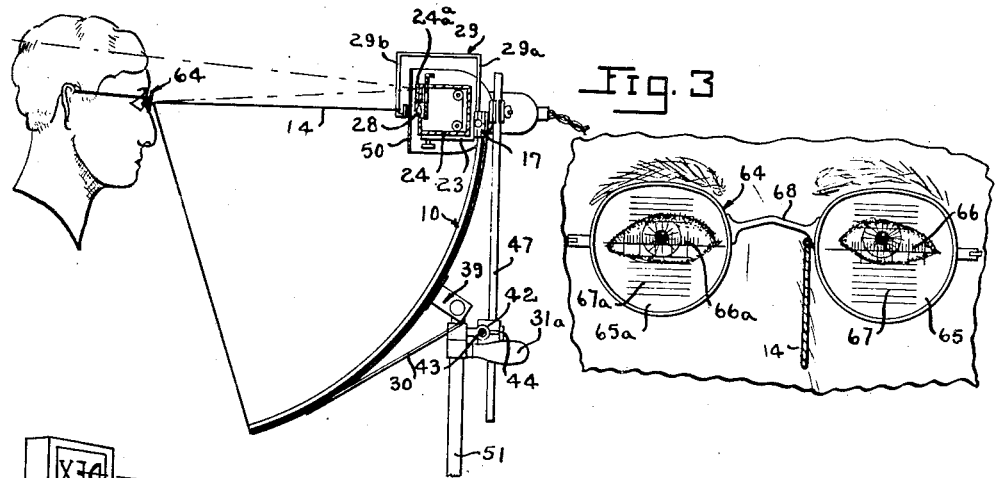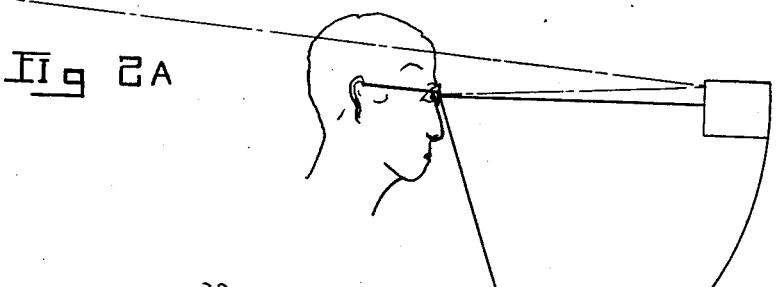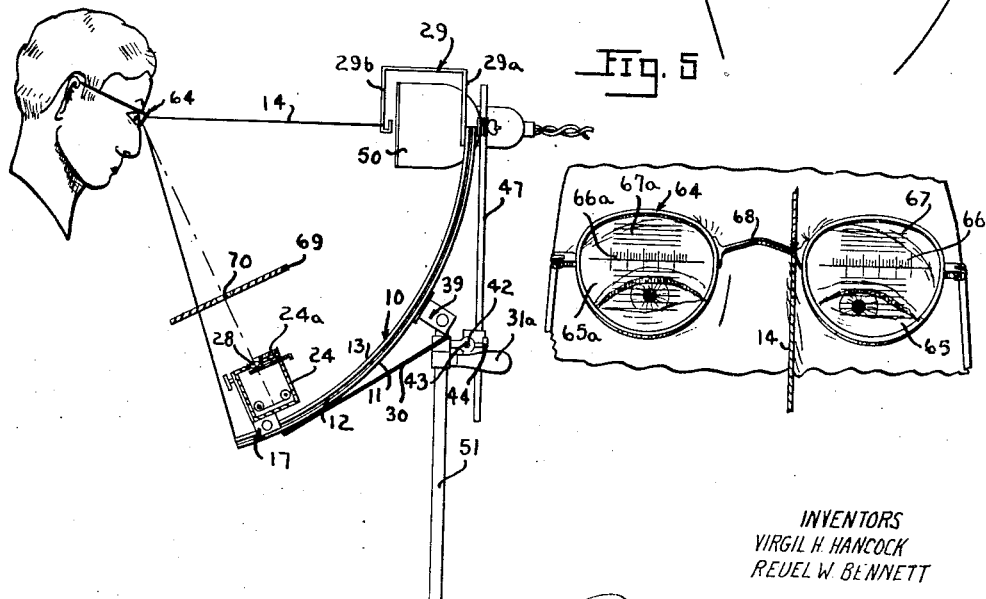

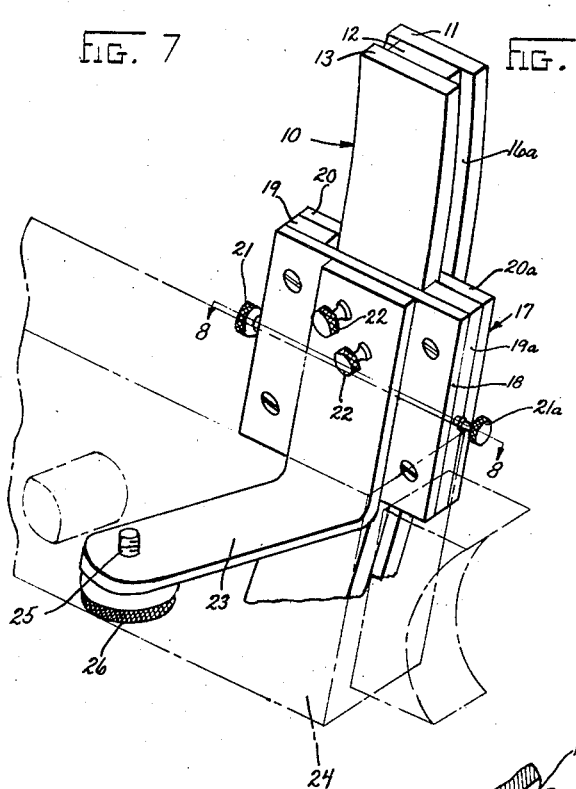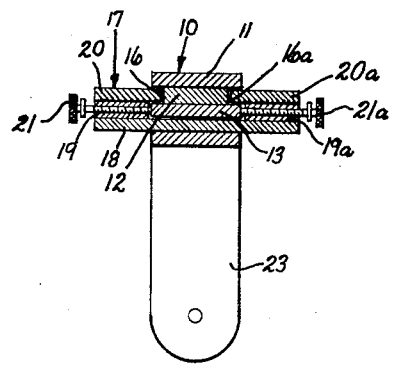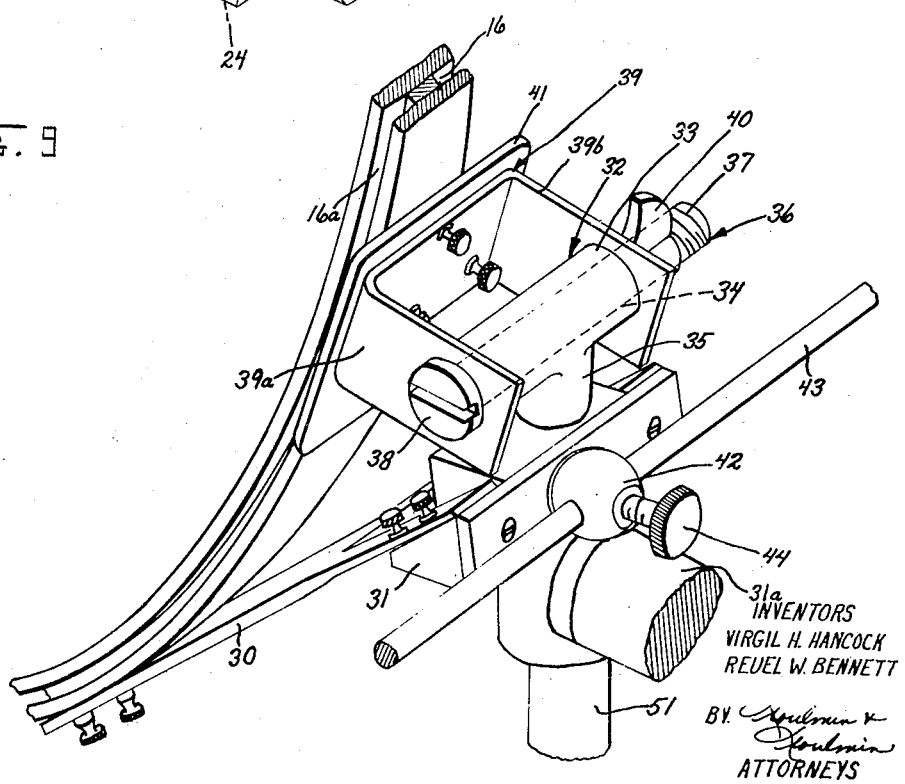

2,325,569

UNITED STATES PATENT OFFICE 2,325,569

EYE TESTING DEVICE

Virgil H. Hancock, Columbia, La., and Reuel W. Bennett, Chicago, Ill.

Application August 2, 1940, Serial No. 349,930

2 Claims. (Cl. 88—20)

The present invention relates to eye testing and in particular to a method of and device for determining the relative distance of the eye centers of a person when reading and when looking at infinity.

It is an object of the invention to provide an improved eye testing method which will allow more accurately to make bifocal eye glasses for and adapt the same to each individual condition.

It is another object of the invention to provide improved means for eye testing which will enable a more exact location of the normal and the reading centers respectively of eyes.

A further object of the invention consists in providing an improved eye testing device for a more accurate recording of the eye centers of a person when reading and when looking straight ahead.

It is also an object of the invention to provide improved eye testing means for determining the relative vertical and horizontal spacing of the eye centers of a person when reading and when looking at infinity.

It is a still further object of the invention to provide an eye testing device of the above type which is easy to adjust and to handle, simple in construction and cheap to manufacture.

These and other objects and advantages will appear more clearly from the following description in connection with the accompanying drawings in which:

Figure 1 shows the assembly of an eye testing device according to the present invention;

Figure 2 illustrates a part of the eye testing device according to the invention in one operative position;

Figure 2a is a view showing the eye testing device and associated chart member;

Figure 3 is a picture taken with the eye testing device in the position of Figure 2;

Figure 4 is a view similar to that of Figure 2 but with the eye testing device in another operative position;

Figure 5 is a picture taken with the eye testing device in the position of Figure 4;

Figure 6 shows calibrated eye glasses having attached thereto spacer means as used in connection with the present invention;

Figure 7 illustrates a part of the arched member shown in Figure 1 in connection with a support for a camera;

Figure 8 is a section along the line 8—8 of Figure 7;

Figure 9 illustrates a portion of the support for the arched member shown in Figure 1.

General arrangement

In general the eye testing device according to the invention comprises an arched member carrying adjustable thereon a camera for taking pictures of the eyes to be tested. The arched member is provided with spacing means for locating the eye testing device relative to the eyes to be tested so that the center of curvature of the arched member lies on an axis connecting the two centers of the said eyes. The camera is provided with a small mirror arranged immediately above the camera lens.

For testing the eyes of a person, the person is provided with a pair of spectacles having a pair of normal glasses bearing vertical and horizontal calibrations, and the arched member carrying the camera is so placed that its center of curvature lies on the axis connecting the eyes to be tested, while the plane of the arched member is substantially perpendicular to said axis. Thereupon a subject is preferably placed some eighteen feet back of the person whose eyes are to be tested. The camera is then focussed midway between the lens and cornea of the eyes to be tested and is moved into position level with the person's line of distance vision so that a virtual image of the subject in the rear of said person will appear in the small mirror immediately above the camera lens and the eyes to be tested when looking into the mirror will have the position they normally adopt when looking at infinity.

With the eyes in this position, a first picture is taken which, by means of the photographed calibration on the eye glasses, will indicate the location of the pupils and centers of the tested eyes when looking at infinity. After this first picture is taken the person assumes his natural reading position and the camera is moved into alignment with the person's line of reading vision, whereupon a second picture is taken. This second picture will then, similarly to the first picture, indicate the position of the person's eye centers when reading.

Structural arrangement

Referring now in detail to the drawings, the device according to the present invention comprises an arched member, generally designated 10, which may be composed of three bent members 11, 12 and 13 and which has attached thereto adjacent its ends a cord 14, a flexible wire or other spacing means. The cord 14 is provided with a mark such as a loop 15 which when the cord is in proper position, approximately coincides with the center of curvature of said arched member. The arched member 11 has on each side a U-shaped guiding surface 16, 16a engaged by a correspondingly shaped part of a slide, generally designated 17. The slide 17 may be made of one piece but is preferably composed of a relatively wide front plate 18, having screwed or otherwise connected therewith, a pair of side plates 19, 20 and 19a, 20a. Each of the side plates 19 and 19a has a threaded bore, engaged by an adjusting screw 21, 21a adapted to engage the bent member 13 of the arched member 10 to lock the slide 17 thereto. Connected with the slide 17, for instance by means of screws 22, is an L-shaped bracket 23 for supporting a camera 24. The camera 24 is removably connected to the bracket 23 by means of a screw 25 having a knurled head 26. The screw 25 engages the threaded opening usually provided in cameras to connect the same with tripods. The camera may be of any desired type but the operation of the eye testing device is materially facilitated when a camera is used which has an observation opening 27 so arranged that the operator can observe the eyes to be tested when looking in a direction perpendicular to the axis of the camera lens 28. The camera is provided with a small mirror 24a arranged immediately above the camera lens 28.

By moving the slide 17 along the guiding surfaces 16 and 16a and then tightening the screws 21, 21a, the camera can be held in any desired position. To be able to move the camera 24 to the uppermost end of the arched member 10, the arched member 10 has connected to its upper end a U-shaped bracket 29 having its arms 29a and 29b sufficiently spaced to allow the camera 24 to enter therebetween. The arm 29b has attached thereto one end of the cord 14 while the other end of the cord 14 is connected with the lower end of the arched member 10. If desired, a bracket similar to the U-shaped bracket 29 may be attached to the lower end of the arched member 10 and the adjacent end of the cord 14 may be fastened to one arm of said bracket, thereby increasing the range within which the camera may be adjusted on the arched member 10.

The arched member 10 is carried by an arm 30 having its lower end screwed or otherwise connected with the lower end of the arched member 10. The upper end of the arm 30 is fork-shaped and connected with a support 31. The support 31 carries a T-shaped member, generally designated 32, which has a horizontal portion 33 with a bore 34 therethrough and a vertical portion 35 connected to the support 31. A bolt 36 having a threaded portion 37 and a preferably slotted head 38 passes through the bore 33 and carries a U-shaped bracket 39 having its legs 39a and 39b rotatably mounted on the bolt 36 at both sides of the horizontal portion 33 of the T-shaped member 32. The threaded portion 37 of the bolt 36 carries a correspondingly threaded nut 40 which when tightened holds the bracket 39 in the desired position.

The U-shaped bracket 39 is screwed or otherwise connected to a plate 41 which in its turn is fastened to the arched member 10. The support 31 comprises a lug 42 carrying adjustably mounted therein a rod 43. A locking screw 44 locks the rod 43 in the lug 42 in any desired horizontal position. On each end of the rod 43 is adjustably mounted a connecting block 45, 45a having a locking screw 46, 46a for locking the connecting blocks on the rod 43. Through each of the connecting blocks passes a vertical rod 47, 47a which may likewise be adjustably mounted in the connecting block 45 and 45a respectively and which carries a lamp support 48, 48a. Each lamp support has pivotally connected therewith a bracket 49, 49a supporting a lamp 50, 50a, so as to allow a proper adjustment of the lamps. If desired, the lamp supports 48, 48a may also be adjustable on their respective rods 47, 47a.

The support 31 is rotatably mounted on the upper end of a supporting rod 51 and may be rotated by 360° by means of the handle 31a connected to the support 31, a locking screw (not shown) being provided for locking the support 31 and thereby the arched member 10 in the desired position. The rod 51 is telescoped in a tubular standard 52 mounted on a support 53 and provided with a handle 52a for moving said standard. The rod 51 may be lifted or lowered by means of the handle 31a and locked in its desired position by means of the locking screw 54. The support 53 is provided with two pairs of rollers 55, 55a respectively movable in slots 56, 56a of a slide 57. The support 53 also carries a locking bolt 58, the lower end of which is T-shaped (not shown) and engages a correspondingly shaped T-slot 59 provided in the slide 57. The upper end of the locking bolt 58 is threaded and engaged by a nut 60 provided with a handle 60a.

By operating the handle 60a so as to tighten the nut 60, the T-shaped portion of the locking bolt 58 is clamped to the T-shaped slot 59 thereby locking the support 53 in the desired position on the slide 57. The slide 57 likewise carries rollers (not shown) which engage grooves 58a, 58b arranged rectangular to the grooves 56, 56a so as to allow an adjustment of the slide 57 in a direction transverse to the direction of movement of the support 53 in the slide 57. The slide 57 is also provided with a locking bolt 61 which engages a T-slot 62 and has a locking nut 63 for locking the slide 57 in the desired position. The grooves 58a and 58b may be provided in the floor of the room in which the eye testing device is located.

In connection with the device hereinbefore described for testing the eyes, a pair of spectacles, generally designated 64, is used which is provided with a pair of normal glasses 65, 65a and is adapted to and to be worn by the person whose eyes are to be tested. Each of the glasses 65, 65a has vertical calibrations 66, 66a and horizontal calibrations 67, 67a.

Operation

The operation of the device is as follows:

The person whose eyes are to be tested is seated on a chair, preferably an armless chair to insure freedom of arm movement, and puts on the pair of spectacles 64 after the loop 15 or the otherwise marked portion of the cord 11 has been attached to the spectacles, preferably adjacent one end of the bridge 68 thereof. The loop 15 of the cord is so located that when the apparatus is properly adjusted, the loop 15 approximately coincides with the center of curvature of the arched member 10. The person's eyes are then tested by taking a picture of the person's eyes when looking at infinity and another picture when reading.

To properly locate the testing device after the person whose eyes are to be tested has put on the pair of spectacles 64, the slide 57 is moved to and locked in a position where the plane rectangular to the bridge 68 and passing through the middle thereof comprises the axis of the camera lens 28. Assuming that in this position the cord 14 is still slackened, the support 53 is now moved away from the eyes to be tested until the cord 14 is tightened. In this position, in which the support 53 is locked by operation of the locking handle 60a, the loop 15 approximately coincides with the center of curvature of the arched member 10. The lamps 50 and 50a are then properly adjusted and a subject C is placed about eighteen feet behind the person whose eyes are to be tested in such a position that it will be reflected by the mirror 24a of the camera 24 when the latter is in its upper position. Thereupon the camera 24 is focussed midway between the lens and cornea of the person's eyes to be tested and is moved into position level with said person's line of vision so that a virtual image of the subject in back of the person will appear in the mirror 24a and the eyes to be tested, when looking into the mirror, will have the normal position of distance vision.

If the eye testing device is thus adjusted, it will be in the position shown in Figure 2, and a picture of the eyes taken in said position may, for instance, be similar to the picture of Figure 3. As will be clear from Figure 3, the center of the person's right eye (the eye adjacent Figure 2) is lower than the center of the person's left eye. The exact distances of the eyes centers from the graduated horizontal line and from each other are indicated by the calibrations on the glasses.

The person whose eyes are to be tested then assumes his natural reading position. Preferably the person is given a reading card 69 having in its center an aperture 70 which will enable the operator to bring the camera lens in alignment therewith and to observe therethrough the position of the person's eyes.

If desired, a transparent subject of glass or other material may be used instead of the reading card. The camera is then moved to a position in which the camera lens is in alignment with the aperture in the reading card so that the axes of the aperture and the lens coincide and lie in a common plane with the line connecting the eye centers to be tested. Thereupon the cord 14 will be tightened in the manner described above, and after the testing device is properly adjusted, a second picture is taken which may, for instance, be similar to the picture illustrated in Figure 5.

By means of the photographed horizontal and vertical calibrations on the glasses, the reading centers of the tested eyes can readily be determined so as to allow a proper manufacture of the reading glasses. If desired, two or more pictures of the eyes to be tested may be taken in each position, and the spectacles for the tested eyes may be prepared in accordance with the average result derived from the pictures.

It will be understood that we desire to comprehend within this invention such modifications as come within the scope of the claims and the invention.

Having thus fully described our invention, what we claim as new and desire to secure by Letters Patent is:

1. In combination in an eye testing device, picture taking means for taking pictures of the eyes to be tested, a member arched in a substantially vertical plane and adjustably supporting said picture taking means, means for adjustably positioning said picture taking means on said member, a flexible wire or cord having its ends respectively attached to said arched member adjacent the ends thereof and being provided with connecting means intermediate its ends, said connecting means being adapted to be connected with the bridge portion of a pair of graduated spectacles intermediate the glasses thereof and being so located as to coincide approximately with the center of curvature of said arched member when the cord or wire is in tightened condition and the plane through said wire or cord approximately forms a plane of symmetry of said arched member, said center of curvature indicating a point of said bridge portion when said pair of spectacles properly covers the eyes to be tested.

2. In combination in an eye testing device, picture taking means for taking pictures of the eyes to be tested, an arched member arranged in a substantially vertical plane and adjustably supporting said picture taking means, means for adjustably positioning said picture taking means on said member, a flexible wire or cord having its ends respectively attached to said arched member adjacent the ends thereof and being provided with connecting means intermediate its ends, a pair of spectacles having graduated glasses, said connecting means being connected with said pair of spectacles intermediate said glasses at a point approximately coinciding with the center of curvature of said arched member when the cord or wire is in tightened condition and the plane through said wire or cord approximately forms a plane of symmetry of said arched member.

VIRGIL H. HANCOCK.
REUEL W. BENNETT.